Aug. 19, 1924.
E. H. GOLD
HOSE CLAMP
Filed April 30, 1921
1,505,255
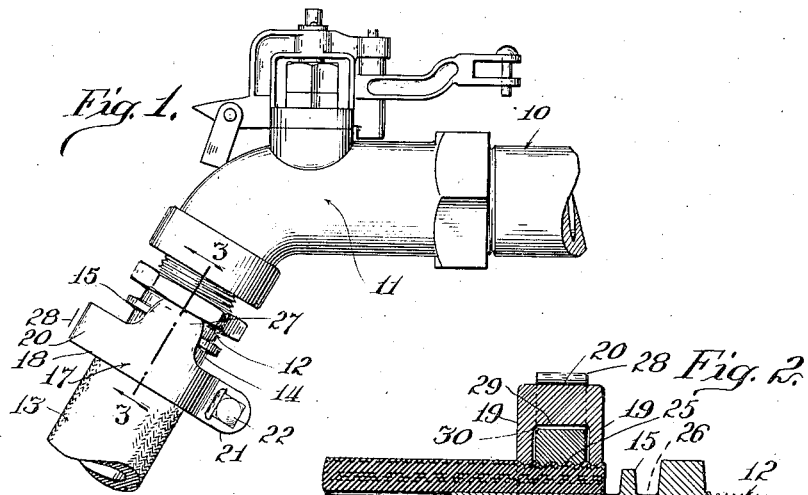
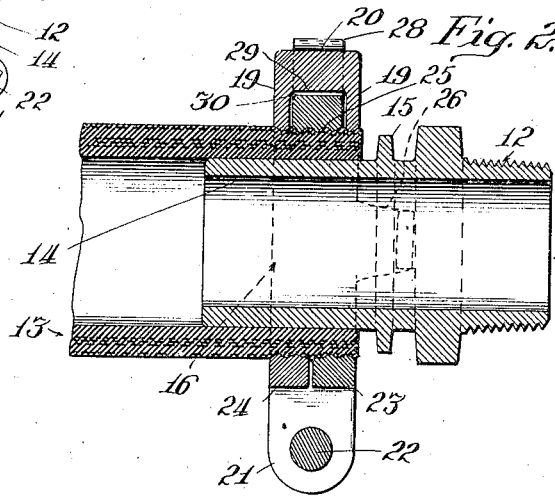
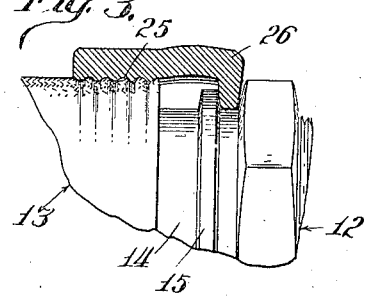
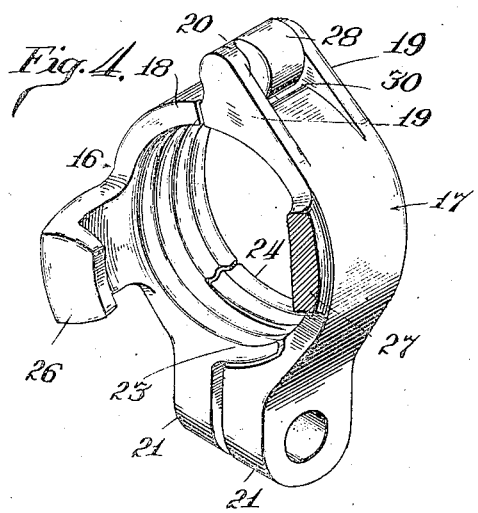
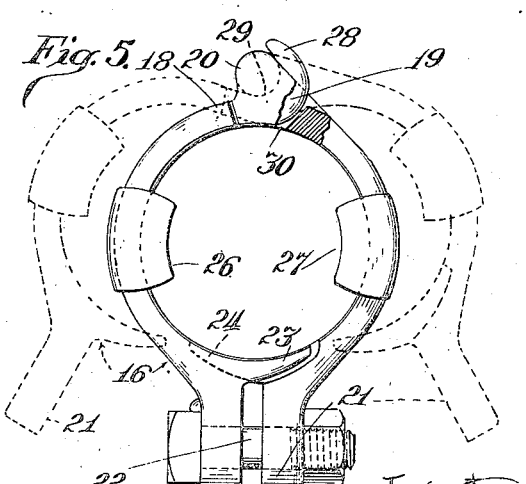
Inventor
Egbert H Gold
by Barnett Numan
Attorneys Patented Aug. 19, 1924.

1,505,255

UNITED STATES PATENT OFFICE.

EGBERT H. GOLD, OF CHICAGO, ILLINOIS.

HOSE CLAMP.

Application filed April 30, 1921. Serial No. 465,790.

*To all whom it may concern:*

Be it known that I, EGBERT H. GOLD, a citizen of the United States, residing at Chicago, in the county of Cook and State of Illinois, have invented certain new and useful Improvements in Hose Clamps, of which the following is a specification.

My invention relates to a hose clamp, and has for its primary object to provide a novel hose clamping device which is particularly suitable for clamping the flexible train pipe hose of railway cars to the angle cock of the train pipe, or to the hose coupler.

It is desirable that devices of this character be very strong and be capable of being readily applied to and removed from the connections between the hose and the train pipe or coupler, as the case may be, so as to enable the trainmen to make repairs as quickly as possible, and that the device, when applied, will firmly grip the entire circumference of the hose, so as to provide a tight joint that will withstand considerable internal pressure and resist the other strains to which such connections are subjected when in service, such, for example, as the strains resulting from the pull on the hose when the train is rounding a curve, or when the hose couplers are automatically disconnected by uncoupling the car couplers without disconnecting the train pipe couplers.

It has been customary, prior to my invention, to make train pipe hose clamps in two sections, adapted to be bolted together on opposite sides of the hose, but such devices are not entirely satisfactory for the reason that the workman applying them often neglects or otherwise fails to tighten both bolts, so as to insure a reliable connection. If the bolts are tightened so as to draw the ends of the clamp sections closer together on one side of the hose than on the other, the hold of the clamp on the opposite side of the hose is frequently insufficient to prevent the fluid under pressure in the train pipe from escaping at that point.

One of the specific objects of my invention is to overcome the above-mentioned, and other incidental objections to the use of a two-piece clamp of the type employing two bolts, by providing a clamp consisting of two sections hinged together on one side of the hose, and adapted to be drawn together in clamping engagement with the hose by means of one bolt only, the ends of each section adjacent the bolt being formed with projections which underlap the other section. It will be seen that a clamp of this construction may be flexed at the hinged connections to permit it to be readily applied to or removed from its operative position, that it may be manufactured at a relatively low cost, and that when applied will firmly grip the entire circumference of the hose with a substantially uniform pressure.

The invention consists in the novel arrangements, constructions and combinations of parts and devices, hereinafter described and claimed, for carrying out the above-stated objects, and such other objects as will appear from the following description of a preferred embodiment of the invention.

My invention is illustrated in the accompanying drawing, wherein:

Fig. 1 is a side view in elevation of a train pipe angle cock and hose, showing the hose connected to the usual angle cock nipple by means of a clamp device constructed in accordance with my invention.

Fig. 2 is a longitudinal section taken through the hose and nipple, showing my improved hose clamp in its applied position.

Fig. 3 is a fragmentary view, partly in section, taken on line 3—3 of Fig. 1.

Fig. 4 is a view in perspective of the clamp device; and

Fig. 5 is a plan view of the device, the dotted line position shown in this figure showing the clamp in its opened position.

Like characters of reference designate like parts in the several figures of the drawing.

In the drawing I have shown my improved clamp employed to fasten the upper end of the hose to the angle cock of a train pipe, although it will be obvious that it may be used, if desired, to fasten the other end of said hose to the hose coupler.

Referring to the drawing, 10 designates the train pipe of a railway car, 11 the train pipe angle cock, 12 the usual nipple fitted into the end of the angle cock, and 13 the flexible hose for connecting the train pipes of adjacent cars. The nipple is formed with a cylindrical portion 14 of uniform diameter which extends into the hose, and is provided with a circumferential flange 15, which is engaged by hook members of the hose clamp when the device is in its applied position.

The hose clamp of my invention preferably consists of a ring made up of two sections 16, 17, having their ends 18, 19, hinged together, as indicated at 20. The other ends of said sections are formed with perforated lugs 21 adapted to receive a clamping bolt 22, which, when tightened, draws the sections 16, 17, of the ring together, so as to firmly grip the entire circumference of the hose. In order to insure a firm grip of the device on the entire circumference of the hose, the lug ends of the sections of the device are provided with projections 23, 24, which overlap each other laterally, that is, in the direction lengthwise of the hose with their interior circumferential edges in contact, or substantially in contact, so that the line of parting or gap between the sections is not continuously across the clamp but consists of two separate offsets and offset gaps. As a result the tendency of the clamp to pinch the hose is lessened and if a gap exists between the sections, as is necessary to a certain extent, it is not a continuous gap such as to allow continuous bulge of the hose across the clamp likely to cause leakage under high pressure.

The inner surfaces of both sections are formed with circumferential ribs 25 which are embedded in the relatively tough outer fabric of the hose when the sections of the device are drawn together by tightening the clamp bolt 22. These ribs preferably mate one with another at the meeting edges of the clamp sections so as to provide, in effect, ribs which extend entirely around the hose. The sections 16, 17 are formed at points intermediate the lugs 21 and hinge 20 with oppositely disposed hooks 26, 27, which fit over the circumferential flange 15 of the nipple 12. With this construction the strains on the connection between the hose and nipple, resulting from the weight of the hose couplers, or the pull on the hose when the train is rounding a curve, or during the automatic uncoupling of the hose couplers, are resisted by the firm connection of the clamping device with the relatively tough outer fabric of the hose 13 and the rib 15 of the nipple.

The hinged connection 20 of the clamp sections is preferably provided by forming the section 16 with an outwardly projecting hook-like tongue 28, which projects into and engages with the rounded edge 29 of an opening 30 formed in the adjacent end 19 of the section 17. The inner portion of the tongue 28 bears against the hose in the space formed by the opening in the other sections so that at this place also the hose has no chance to bulge or form a continuous rib for the width of the clamp which, if it occurred, would be likely to allow steam to leak to the eventual damage and destruction of the hose. By hinging the clamp sections together in the above manner, my improved clamping device presents the combined advantages and eliminates the objections of the one-piece and sectional types of train pipe hose clamping devices, in that it may be made relatively heavy, so as to withstand the rough use to which it is subjected when in service, and in that it may be readily flexed at the hinge, to permit the hooks 26, 27 to clear the circumferential flange 15 of the nipple 12 when the device is applied. Furthermore, the device requires the tightening of one bolt only to effect a firm, clamping action without danger of crimping, or otherwise damaging the hose. It will also be noted that the hinged connection permits the sections to be readily disconnected, one from the other, so that in the event that one section is damaged, the damaged section may be replaced, and thereby avoid the necessity of discarding the entire device.

While I have described my invention in one specific embodiment, it will be obvious from the above description that modifications might be made in structure without departure from my invention. I therefore wish it understood that my invention contemplates all such modifications as come within the scope of the appended claims.

I claim:

1. A clamp for fastening a flexible hose to a conduit comprising a pair of arcuate sections, means providing a hinging engagement between said sections, a lug on each of said sections, and means for drawing said lugs together; the ends of said sections remote from the hinged ends being narrower in the direction of the length of the hose than the other portion of said sections forming complementary projections at opposite sides of said sections respectively; having arcuate inner surfaces of the same curvature as and continuous with the inner surfaces of the other portions of said sections, which projections overlap each other laterally with their interior circumferential edges in contact, for the purpose described.

2. A clamp for fastening a flexible hose to a conduit comprising a pair of arcuate sections, one section provided with a hook like tongue, the inner portion of which bears against the hose and the other section with an opening through which the tongue projects, and with a rounded surface for hinging engagement with said tongue, a lug on each of said sections, and means for drawing said lugs together; the ends of said sections remote from the hinged end being narrower in the direction of the length of the hose than the other portions of said sections forming complementary projections at opposite sides of said sections respectively having arcuate inner surfaces of the same curvature as and continuous with the inner surfaces of the other portions of said sections, which projections overlap each other laterally with their interior circumferential edges in contact, for the purpose described.

EGBERT H. GOLD.